(12) United States Patent
Willett

(10) Patent No.: US 7,686,008 B2
(45) Date of Patent: Mar. 30, 2010

(54) INSULATION FOR BAKING CHAMBERS IN A MULTI-DECK BAKING OVEN

(75) Inventor: Paul Eaton Willett, Whiteside (AU)

(73) Assignee: Moffat Pty Limited, Mulgrave (AU)

( * ) Notice: Subject to any disclaimer, the term of this patent is extended or adjusted under 35 U.S.C. 154(b) by 134 days.

(21) Appl. No.: 11/852,754

(22) Filed: Sep. 10, 2007

(65) Prior Publication Data

US 2008/0216811 A1    Sep. 11, 2008

(30) Foreign Application Priority Data

Sep. 11, 2006    (AU) .............................. 2006905005

(51) Int. Cl.
F24C 15/16    (2006.01)

(52) U.S. Cl. ................. 126/19 R; 126/21 A; 126/21 R; 99/443 R; 99/447; 99/448

(58) Field of Classification Search ............... 126/19 R, 126/21 A, 21 R
See application file for complete search history.

(56) References Cited

U.S. PATENT DOCUMENTS

| | | | | | |
|---|---|---|---|---|---|
| 1,560,847 | A | * | 11/1925 | Parke | 126/339 |
| 1,980,307 | A | * | 11/1934 | Wilkinson et al. | 126/39 C |
| 2,077,687 | A | * | 4/1937 | Goldbert et al. | 219/400 |
| 3,362,081 | A | * | 1/1968 | Bogenberger | 34/467 |
| 3,408,785 | A | * | 11/1968 | Kochanowski | 126/200 |
| 4,008,996 | A | * | 2/1977 | Wells | 432/128 |
| 4,253,286 | A | * | 3/1981 | Katona | 52/171.1 |
| 4,527,538 | A | * | 7/1985 | Caferro | 126/21 R |
| 4,538,050 | A | * | 8/1985 | Willett | 219/388 |
| 4,884,552 | A | * | 12/1989 | Wells et al. | 126/19 R |
| 5,255,969 | A | * | 10/1993 | Cox et al. | 312/236 |
| 5,277,105 | A | * | 1/1994 | Bruno et al. | 99/443 C |
| 5,421,320 | A | * | 6/1995 | Brown | 126/299 R |
| 5,763,857 | A | * | 6/1998 | Klement et al. | 219/407 |
| 5,875,705 | A | * | 3/1999 | Knost | 99/443 C |
| 6,905,332 | B1 | * | 6/2005 | Neal et al. | 432/247 |
| 7,129,447 | B1 | * | 10/2006 | Kim et al. | 219/394 |
| 2005/0133016 | A1 | * | 6/2005 | Neal et al. | 126/19 R |
| 2006/0070614 | A1 | * | 4/2006 | Spangrud | 126/25 R |
| 2007/0266740 | A9 | * | 11/2007 | Kendall et al. | 68/3 R |

FOREIGN PATENT DOCUMENTS

GB    901723 A    7/1962

* cited by examiner

*Primary Examiner*—Kenneth B Rinehart
*Assistant Examiner*—Frances Kamps
(74) *Attorney, Agent, or Firm*—Christensen O'Connor Johnson Kindness PLLC

(57) ABSTRACT

A multi-deck baking oven including a housing and at least two baking chambers located within the housing, adjacent baking chambers being separated by an insulating layer, at least one of the insulating layers including a hollow partition, wherein each insulating layer dampens the rate of heat flow between the adjacent baking chambers.

16 Claims, 2 Drawing Sheets

INSULATION FOR BAKING CHAMBERS IN A MULTI-DECK BAKING OVEN

FIELD OF THE INVENTION

The present invention relates to ovens for the baking of pastry products and, in particular, insulation for multi-deck type baking ovens.

BACKGROUND OF THE INVENTION

It is common for baking ovens to have a number of individual chambers or decks, mounted usually one above the other. This design permits several different products to be baked at once. In this arrangement, each product is located on a separate deck, having its own air temperature, steam atmosphere and bake time.

Separating one baking chamber from another is usually accomplished by inserting insulation (e.g. rockwool) between the baking chamber's floor and roof. This avoids unwanted heat from one baking chamber, travelling through to the walls which separate the adjacent baking chambers. The heating chambers are generally fully sealed from one another so that steam and byproducts of the baking process cannot travel into the insulating material, or into the other baking chambers.

While the insertion of thermal insulation material between the heating chambers has been effective in thermally isolating each heating chamber, the required thickness of the insulation layer has limited the number of vertically stacked baking chambers which can be readily accessed by the oven's operators. For example, the height of five baking chamber oven, using conventionally insulating material, is such that the top and/or bottom baking chambers are difficult to reach. The resulting poor ergonomics of these ovens represent a serious health and safety concern.

Excessive insulation thickness is especially a problem in ovens which have the heating elements located under the oven floor, forming a false floor and/or false roof. The heat built up under the false floor/roof creates a greater insulating need and hence thicker insulating material is required.

To address this problem, the use of highly compressed insulating material has only been partly successful. The pitfall with using compressed insulating material is that it can become brittle, and the denseness of the material can cause the material to gradually absorb heat, until it becomes as hot as the heating chambers above and below. This banking of heat then works in reverse to being an insulator, and instead acts as a heat source for heat into the chambers. The baking characteristics therefore changing as the heat bank gets hotter, leading to the production of poor quality baked goods. Further, insulating material although initially isolated from the baking chambers is still prone to entering the baking chambers as the oven deteriorates with age. Thus, the use of fibrous insulating material presents a hygiene and contamination hazard over the life of the oven which must be addressed.

Accordingly, there is a need for an improved insulation system which avoids the use of bulky and/or contaminating insulation material.

SUMMARY OF THE INVENTION

In a first aspect of the present invention, there is provided a multi-deck baking oven including: a housing and at least two baking chambers located within the housing, adjacent baking chambers being separated by an insulating layer, at least one of the insulating layers including a hollow partition, wherein each insulating layer dampens the rate of heat flow between the adjacent baking chambers.

The oven preferably has at least three, four or five baking chambers.

The hollow partition preferably includes a first and a second wall member which defines an internal void. The hollow portion may be characterised by the absence of insulation or solid material. The internal void is preferably filled only with air or heated gases. The wall members are preferably thin walled.

A fundamental difference between the insulating system of the present invention over conventional insulating systems is that the insulating layer of the present invention rapidly reaches an equilibrium temperature between adjacent baking chambers. The insulating material of conventional insulating layers inherently takes a long period to heat up and cool down. Therefore, in conventional ovens the heat flow between adjacent baking chambers is continually changing and with it the baking quality within the baking chambers. The insulating layer of the present invention functions as a heat exchange buffer layer by dampening the rate of heat flow between adjacent chambers. This is achieved through heat transfer from adjacent heating chambers rapidly equilibrating the temperature within the hollow partition. By focusing on controlling the heat balance between the baking chambers, rather than attempting to thermally isolate each baking chamber, thermal regulation of the baking chambers may be more efficiently and effectively achieved.

The oven may further include a bake computer to regulate the heat balance within the oven. Temperature sensor, such as thermocouples, may be placed in each heating chamber and/or hollow partition to aid the bake computer regulate heat flow. Each baking chamber preferably has its own heating element, which is regulated by the bake computer based upon the temperature of the bake chamber and adjacent baking chambers and/or the temperature within the adjacent hollow partition(s). A suitable oven control is described in Australian patent application no. 2007201770, the whole contents of which are incorporated by reference.

For structural support, the first and second wall members may be connected by one or more reinforcing rib members. The reinforcing rib members are designed to provide sufficient structural strength while minimising the level of conductive heat transfer through the hollow partition. Through the use of reinforcing rib members, the hollow partition may include a series of hollow cells defined by the first and second wall member and adjacent reinforcing rib members. Each hollow cell is preferably in fluid communication with adjacent hollow cells. The reinforcing rib members maybe provided with slots for the passage of gas to enable the gas communication between the adjacent cells.

The gas communication between adjacent air cells enables the temperature in the hollow cells in each insulation layer to equalise.

In one embodiment the internal void of the hollow partitions preferably communicates with the baking chambers, through one or more openings in the first and second wall members. These openings enable convective air/steam currents to rapidly equilibrate the gaseous environment within the hollow partitions to a mean temperature between adjacent baking chambers. To prevent excessive cross-flow of air/steam between adjacent baking chambers, the openings in the first and second wall members are preferably less than 5% of the total surface area of each wall member and more preferably less than 2% of the total surface area of each wall member. Preferably, the openings on each opposing wall member are such that the gaseous flow of a baking chamber must travel along a torturous path to reach the internal space of the adjacent baking chamber.

To restrict air flow (and hence convective heat transfer) between adjacent baking chambers, each hollow partition may include baffle members. The reinforcing rib member may function as a baffle member.

The housing may include an expansion joint, which encompasses the baking chambers, to enable relative movement of the baking chambers within the housing. Each of the hollow partitions is preferably disposed against the expansion joint to enable each of the hollow partitions limited movement.

The distance between the first and second wall member is preferably less than 100 mm, more preferably less than 75 mm and most preferably less than 50 mm.

In a second aspect of the present invention, there is provided a method of regulating temperature in a multi-deck baking oven including the steps of:

inserting a batch of goods to be baked into a baking chamber;

providing the baking chamber with a heat source to bake the goods, the heat source including heat flow to/or from an insulating layer between an adjacent baking chamber having a hollow partition, wherein the insulating layer dampens the rate of heat flow to or from the adjacent baking chamber.

DETAILED DESCRIPTION OF THE EMBODIMENTS

Figure 1:
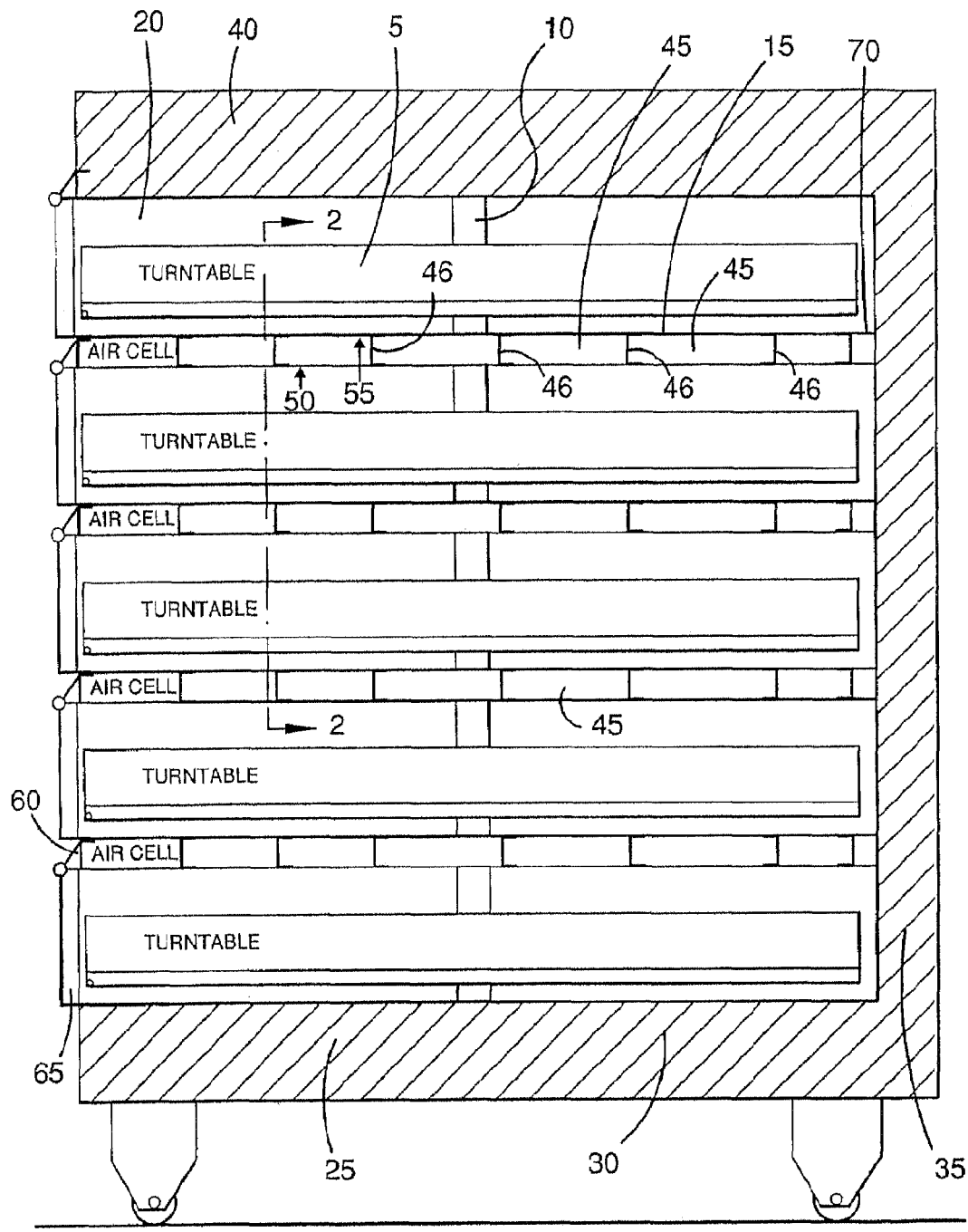
FIG. 1 is a side cross sectional drawing of a multi deck oven in accordance with one embodiment of the present invention.

FIG. 1 illustrates a five deck baking oven, such as a Rotel™ type oven design, where each of the baking chambers 20 has a turntable 5 which revolve around a central shaft 10. Due to the rotating turntables, the heating elements (not shown), typically kelrod™ type electrically powered elements, are mounted above the oven (turntable) floor of each baking chamber. As the heating elements are not proximate to the insulation layer 15, relatively less insulation is required to retain the heat within each baking chamber 20.

The floor of the bottom most baking chamber 25 is typically fully sealed to the wall members of the internal oven housing cell 30. The roof of the top most baking chamber 40 is likewise sealed. Housing insulation under the bottom oven floor 30, oven side walls 36, and roof 40, retain heat in these housing members.

Figure 2:
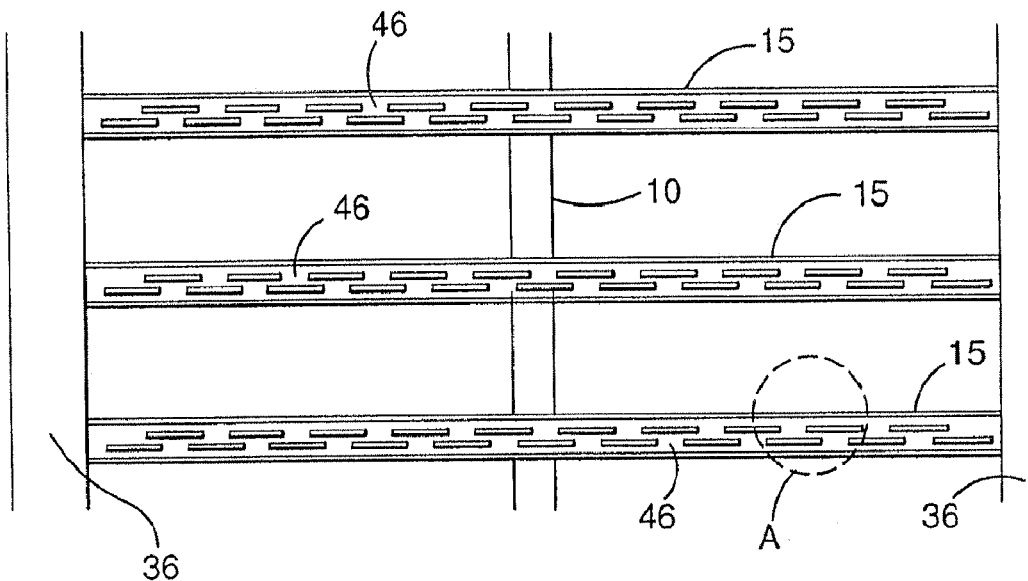
FIG. 2 is a partial sectional view through line 2-2 if FIG. 1 with the turn tables removed.
Figure 2A:
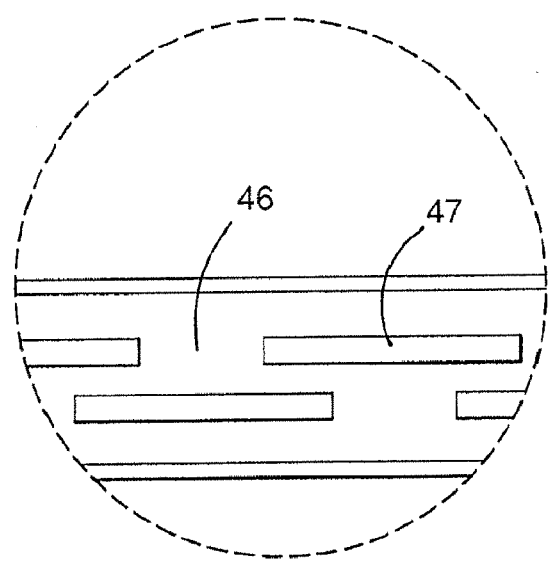
FIG. 2a is an explode view of region A of FIG. 2.

The insulation layer comprises a number of air cells or voids 45 separated by rib members or struts 46 which extend between oven side walls 36. As shown in FIG. 2 and FIG. 2a, the struts are provided with slots 47 which enable gas communication between adjacent air cells. The gas communication between adjacent cells enables the temperature of gas in the hollow cells in each hollow insulation layer to equalise.

In contrast to conventional insulation layers which heat up and develop a thermal inertia which takes considerable time to counteract when the temperature in the oven is altered for the next batch.

As multideck ovens are required to bake a variety of products and with the set temperature needing to be changed depending on the requirements of the next batch, conventional insulation layers develop a thermal inertia which takes considerable time to counteract when the set temperature is altered for the next batch. The insulation layer used in the multideck oven of the invention has gas filled cells and does not develop the same thermal inertia. This enables the heat balance between the baking chambers to be more efficiently and effectively achieved.

The insulation layer 15 may optionally initially draw heated air through openings (not shown) in the first 50 and/or second 55 wall members and into the insulating layer's internal void(s) 45 as the baking chamber heats up. The wall members are preferably constructed of thin stainless steel sheeting.

The insulation layer 15 is attached 60 to the housing, adjacent to the oven doors 65. Preferably the insulation layer is removably disposed against expansion joints 70, which enable some limited movement of the insulating layer within the housing. The insulation layer may be conveniently removable from the attachment 60, to enable oven maintenance and cleaning. Due to the lower weight of the insulating layers and their ergonomically favourable positions, maintenance and cleaning tasks may be more safely and conveniently performed compared to conventional insulating layers.

The temperature of the air/steam within the insulation layer generally averages the air temperature of the adjacent baking chambers. As the insulation layer is not substantially exposed to a colder temperature region to draw heat away from the insulating layer, the ovens of the present invention retain their heat better and require less heat and power to bake product compared to ovens with conventional insulating systems.

The applicants have found that despite temperature differences between adjacent baking chambers of as much as 25° C., bake quality is maintained without significant bake variation. To further facilitate consistent bake quality, the oven preferably includes a bake computer (not shown) to regulate the temperature of individual baking chambers, such that excessive temperature overshooting is avoided. Preferably, the baking computer uses proportion, integral and derivative (PID) controls to minimise temperature variations within and between baking chambers. For instance, the baking computer may anticipate the effect of an increased temperature set point on a baking chamber by reducing the power input into the heating elements of the adjacent heating chambers. As mentioned previously, such an oven control is disclosed in Australian patent application no. 2007201770.

While the optimum gap between the first and second wall members may be determined by reasonable trail and error, the applicants have found that an optimal gap, is approximately 40 mm. This magnitude of gap reduces the overall height of a typical 4, or 5 deck oven by as much as 200 mm. This reduction in height enables the top and/or bottom baking chambers to be more readily accessed for loading and unloading of baked goods.

Small volumes of baking by-products and steam may enter through opening in the partition's thin walls. As a result, there may be a slight transfer of material from one baking chamber to the next, without significant loss of baking quality.

The ability of the hollow partition 15 to insulate, combined with the aircraft like construction of hollow partitions result in a strong, but light insulating system of simple and cost effective design.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A multi-deck baking oven including a housing, at least one heating element and at least two adjacent baking chambers located within the housing, the adjacent baking chambers being separated by a hollow insulating layer, wherein the hollow insulating layer includes a first and second wall member defining an internal void, the first and second wall members respectively forming the floor and ceiling of the adjacent oven chambers and having openings therein to provide a passage between adjacent baking chambers through the internal void in the insulating layer.

2. The oven according to claim 1, having at least three baking chambers with a hollow insulating chamber between adjacent baking chambers.

3. The oven according to claim 1, wherein the openings in the first and second wall members are less than 2% of the total surface area of each wall member.

4. The oven according to claim 1, wherein the wall members are thin walled.

5. The oven according to claim 3, wherein the first and second wall members are connected by one or more reinforcing rib members configured to provide sufficient structural strength to the hollow partition.

6. The oven according to claim 5, wherein the reinforcing rib members define a series of hollow cells within the hollow insulating layer.

7. The oven according to claim 6, wherein the reinforcing rib members are provided with slots for the passage of gas enabling each hollow cell to be in fluid communication with at least one adjacent cell.

8. The oven according to claim 7, wherein the openings in the first and second wall members and the slots between hollow cells in the insulating layer form a path for convective air through the insulating layer.

9. The oven according to claim 1, wherein the distance between the first wall member and the second wall member is less than 100 mm.

10. The oven according to claim 1, wherein the distance between the first wall member and the second wall member is less than 75 mm.

11. The oven according to claim 1, wherein the distance between the first wall member and the second wall member is less than 50 mm.

12. A multi-deck baking oven including a housing, at least one heating element and at least two adjacent baking chambers located within the housing, the adjacent baking chamber being separated by a hollow insulating layer, wherein the hollow insulating layer includes a first and second wall member defining an internal void, the first and second wall members respectively forming the floor and ceiling of the adjacent oven chambers and having openings therein to provide a passage between adjacent baking chambers through the internal void in insulating layer; wherein the openings in the first and second wall members are less than 5% of the total surface area of each wall member.

13. The oven according to claim 12, wherein the first and second wall members are connected by one or more reinforcing rib members configured to provide sufficient structural strength to the hollow partition.

14. The oven according to claim 13, wherein the reinforcing rib members defined a series of hollow cells within the hollow insulating layer; and the reinforcing rib members are provided with slots for the passage of gas enabling each hollow cell to be in fluid communication with at least one adjacent cell.

15. The oven according to claim 14, wherein the openings in the first and second wall members and the slots between hollow cells in the insulating layer form a path for convective air through the insulating layer.

16. A multi-deck baking oven including a housing, at least one heating element and at least two adjacent baking chambers located within the housing, the adjacent baking chambers being separated by a hollow insulating layer, wherein the hollow insulating layer includes a first and second wall member defining an internal void, the first and second wall members respectively forming the floor and ceiling of the adjacent oven chambers and having openings therein to provide a passage between adjacent baking chambers through the internal void in the insulating layer; wherein said passage is torturous.

* * * * *

UNITED STATES PATENT AND TRADEMARK OFFICE
CERTIFICATE OF CORRECTION

PATENT NO.       : 7,686,008 B2                                             Page 1 of 1
APPLICATION NO.  : 11/852754
DATED            : March 30, 2010
INVENTOR(S)      : P. E. Willett It is certified that error appears in the above-identified patent and that said Letters Patent is hereby corrected as shown below:

| COLUMN | LINE | ERROR |
|---|---|---|
| 6 | 6 | "baking chamber" should read |
| (Claim 12, | line 3) | --baking chambers-- |

Signed and Sealed this

Twenty-ninth Day of June, 2010

David J. Kappos
*Director of the United States Patent and Trademark Office*